United States Patent [19]

Nakayama et al.

[11] Patent Number: 5,330,851
[45] Date of Patent: Jul. 19, 1994

[54] CORROSION RESISTANT AL OR AL ALLOY MATERIALS

[75] Inventors: Takenori Nakayama, Kobe, Japan; Toyohiko Konno, Stanford, Calif.

[73] Assignee: Kabushiki Kaisha Kobe Seiko Sho, Kobe, Japan

[21] Appl. No.: 50,994

[22] Filed: Apr. 22, 1993

Related U.S. Application Data

[63] Continuation of Ser. No. 694,394, May 1, 1991, abandoned.

[51] Int. Cl.$^5$ .................... B32B 15/20; B32B 15/04
[52] U.S. Cl. .................... 428/627; 428/632; 428/635; 428/650; 428/651; 428/469; 428/471; 428/472; 428/925; 428/926
[58] Field of Search ........... 428/601, 650, 641, 635, 428/469, 471, 472, 651, 925, 926, 627, 632; 437/192, 194, 196, 197, 199, 201, 131, 133; 148/33

[56] References Cited

U.S. PATENT DOCUMENTS

| | | | |
|---|---|---|---|
| 3,567,509 | 7/1965 | Kuiper | 428/650 |
| 4,561,009 | 12/1985 | Yonezawa et al. | 357/67 |
| 4,643,951 | 2/1987 | Keem et al. | 428/469 |
| 4,783,379 | 11/1988 | Wickersham et al. | 428/641 |
| 4,792,832 | 12/1988 | Baba et al. | 357/16 |
| 4,835,062 | 5/1989 | Holleck | 428/469 |
| 4,904,542 | 2/1990 | Mroczkowski | 428/635 |
| 4,939,316 | 7/1990 | Mahulikar et al. | 174/52.4 |

*Primary Examiner*—John Zimmerman
*Attorney, Agent, or Firm*—Oblon, Spivak, McClelland, Maier & Neustadt

[57] ABSTRACT

A corrosion resistant Al or Al alloy material on the surface of which multi-layer deposits for improved corrosion resistance. The deposits are obtained by laminating more than five layers of unit periodic layers with a thickness of 100 Å or less in which two, or three or more layers of unit deposits, comprised of specific elements, are laminated. Such multi-layer structure can prevent water, chloride and other corrosion accelerating substances from passing through the deposits and reaching the surface of the base material, thus effectively preventing the corrosion of Al or Al alloy.

3 Claims, 2 Drawing Sheets

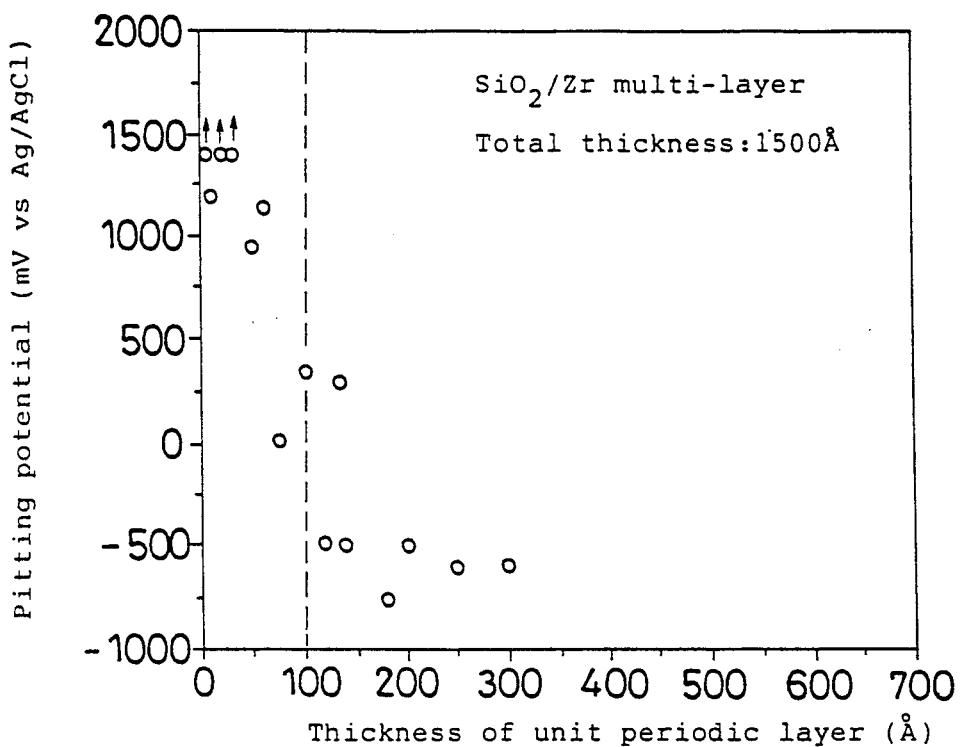

CORROSION RESISTANT AL OR AL ALLOY MATERIALS

This application is a continuation of U.S. application Ser. No. 07/694,394, filed on May 1, 1991, now abandoned.

BACKGROUND OF THE INVENTION

1. Field of the invention

The present invention relates to corrosion resistant Al or Al alloy materials which are coated with a deposit of multilayer structures. These Al or Al alloy materials are useful as components for devices, appliances and equipments of which a high level of reliability is required.

2. Description of the prior art

Al or Al alloy materials are lightweight and possess fairly good strength and corrosion resistance, and also possess excellent workability and electrical properties. Hence, Al or Al alloy materials have found extensive applications as construction materials, automobile wheels and body panels, canning materials and various metallic containers, and further in the electronics field. Despite these advantages, however, it is known that on these Al or Al alloy materials take place corrosions, representative of which is pitting, under acid or alkaline environments, or even under neutral environments where chloride ions and other halogen ions are present. These corrosions cause serious damage to any devices, appliances or equipment which use Al alloy materials as their component material, substantially impairing the reliability thereof.

For instance, in Al conductor materials which are used in semiconductor devices, with the recent trends toward the increasing integration and density of these devices, the materials have become increasingly finer and thinner. This has brought much more attentions to the problem of corrosion resistance. Especially in Al conductor materials that are employed in silicon LSI currently under research and development when an age of submicron is now being entered the ones as fine and thin as approx 1 $\mu$m wide are required. As LSI has become more integrated, the plastic package layer which is used as protective material has not only become smaller and thinner, but they have become more exposed to excessive stress and severe corrosive environments as a result of a production process with higher production efficiency. Much higher degree of reliability of conductor materials against corrosion, as well as their reliability against electromigration and stress migration, has been required than ever before.

Incidentally, the conventional semiconductor devices are housed in a plastic package in order to prevent the penetration of moisture from the atmosphere and avoid deterioration due to oxidation. On the plastic package, various studies about passivation refinement technology have been under way, including the improvement of resin materials.

When a plastic package is used, a direct contact between device and resin is structurally unavoidable. Accordingly, various problems occur which arise from the properties peculiar to the resin comprising the plastic package. Most of the resin, for example, possesses moisture permeability and hygroscopicity, and also contains substances which are easily ionized in the presence of water, such as chloride and sodium, al though in small amounts. There are many defects, including pin holes, and when they are stored or used in an atmosphere with high temperatures and high humidities, moisture penetrates thereinto in a diffusive fashion, and condensates inside the package, causing corrosion of Al conductor materials in semiconductor devices.

To overcome this problem, methods have been proposed in which the corrosive resistance of Al conductor materials themselves are improved by forming passivation coating ($SiO_2$ protective coating) on the surface of Al conductor materials. In a passivation film of single layer structure, however, not al of the pin holes, cracks and other defects can be eliminated no matter how coating materials or coating producing procedures are devised. Moisture and other substances which penetrate through these defects into the package corrode the Al conductor materials, until they are broken. To improve the corrosion resistance, anti-migration property and other reliabilities of the Al materials themselves, methods are proposed in which some 1 to 2 wt % silicon is added to the Al materials, or similar amounts of silicon and about 0.5 to 4 wt % of Cu are added thereto in a combined manner. These methods have proved not to give satisfactory corrosion resistance to the Al materials.

SUMMARY OF THE INVENTION

The present invention has been made, while considering the aforestated circumstances. An object hereof is to provide Al or Al alloy materials with high corrosion resistance which overcome the problem of insufficient corrosion resistance, which has been pointed out for Al materials, and also which do not cause any corrosion even when employed as conductor material of semiconductor devices in high-temperature and high-humidity atmosphere. Another object of the present invention is to provide Al or Al alloy materials with high corrosion resistance which are coated with multiple layers of deposits made of specific components and do not cause any corrosion or breakage even when stored or used in corrosive environments.

These and other objects and features of the present invention will become apparent from the following description.

DISCLOSURE OF THE INVENTION

In a corrosion-resistant Al or Al alloy materials on the surface of which a deposit is formed, the foregoing objects of the present invention can be achieved by structuring the deposit of unit periodic layers formed such that two or three layers of unit deposits comprised of any one of, or two or more of the components to be selected from among the component group enumerated in (1) or (2) below are adjacent to each other, said unit deposits adjacent to each other being composed of said different components, and by rendering each of said unit periodic layers 100 Å or less thick, and the total thickness of the deposit layers more than five times as thick as the average thickness of said unit periodic layer.

(1) Al, Al alloy, Si, Ge, Ti, Zr, Hf, Nb, Ta, Cr, noble metals and inorganic compounds; or
(2) one, or two or more of the components to be selected from among the group of components comprised of Si, Ge, Ti, Zr, Hf, Nb, Ta, Cr, noble metals and inorganic compounds which are different from those as listed in (1) above.

In the above corrosion-resistant Al or Al alloy materials, it is preferred that the component to be selected from the group of components (1) should include Al or Al alloy as one of the components, while oxide, carbide, nitride, boride, silicide, and phosphorous compounds can be exemplified as preferable inorganic compounds in the groups of components (1) and (2).

If used as conductor material for semiconductor device, the corrosion-resistant Al or Al alloy according to the present invention provides a highly reliable semiconductor device which does not cause breakage due to corrosion.

BRIEF DESCRIPTION OF DRAWINGS

In the drawings:

FIGS. 2 and 3 are graphical representations indicating the relationships between the thickness of a unit periodic layer and pitting potential.

FIG. 4 is a graphical representation indicating the relationships between the repetition number of the unit periodic layers and pitting potential.

DETAILED DESCRIPTION OF THE INVENTION

As previously mentioned, the cause for which Al or Al alloy materials cause corrosion lies in the presence of moisture, chloride ion and other corrosion accelerating substances in a storage or usage environment thereof. Accordingly, if the surface of Al or Al alloy materials is coated with protective coating to ensure that these corrosion accelerating substances are not in direct contact therewith, the Al or Al alloy material should be prevented from corrosion. As has been noted above, however, with the conventional protective coating of a single layer structure, pin holes, cracks and other defects cannot be eliminated completely. The aforestated corrosion accelerating substances penetrate through these defects, and hence the corrosion of Al or Al alloy materials cannot be prevented entirely.

According to the present invention, however, superb corrosion resistance can be ensured by making the deposit constituting a protective coating of multilayer construction in which unit periodic layers with thin wall thickness, made up of two or three unit deposit layers being laminated, are laminated in multilayers, as will be described in detail.

Figure 1:
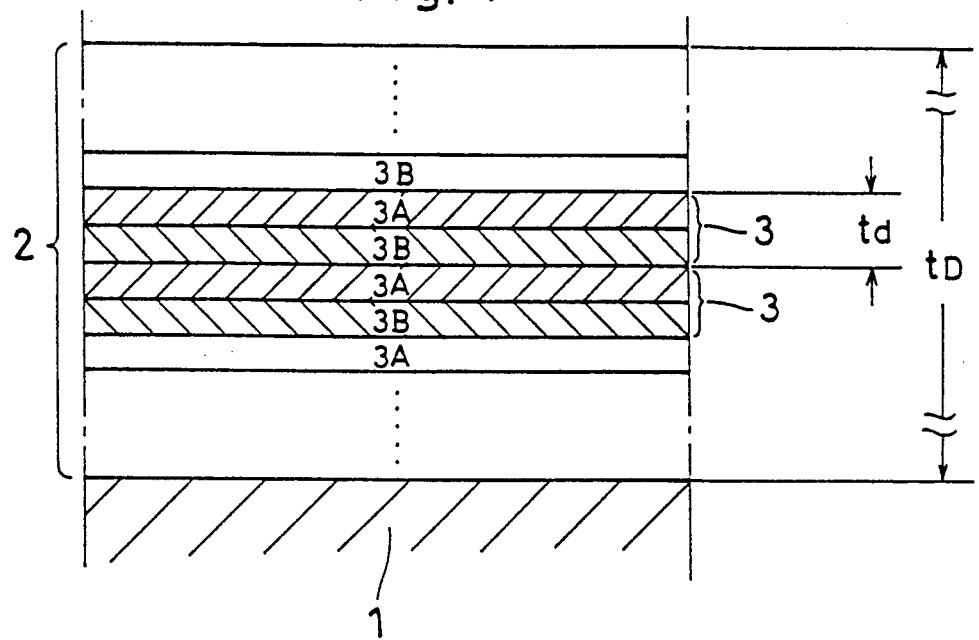
FIG. 1 is a schematic drawing illustrating the sectional structure of the deposit on a corrosion-resistant Al or Al alloy according to the present invention.

FIG. 1 is, for instance, a concept drawing of the sectional structure of the surface layer of the corrosion-resistant Al or Al alloy materials according to the present invention. In the figure, the reference nominal 1 shows the base material comprised of Al or Al alloy, 2 a deposit, 3 a unit periodic layer, 3A and 3B unit deposits, respectively. ($t_d$) represents the mean thickness of a unit periodic layer 3, and ($t_D$) the total thickness of a deposit 2.

The deposit 2 formed on the surface of Al or Al alloy base material of the present invention possesses a structure wherein with the unit periodic layer 3 comprised of two kinds of unit deposits 3A and 3B as a unit, said unit periodic layers are laminated in multiple layers. In this example, two-layer structure comprised of the unit deposit 3A and 3B as unit periodic layer 3 is illustrated. However, three or morelayer structure comprised of unit deposits, 3A, 3B, 3C . . . as unit periodic layer is possible.

In the present invention, as the components comprising the unit deposits 3A, 3B ( which may include C . . . , but the following description will be given as to the simplest construction of 3A and 3B), those indicated in (1) or (2) below are used:

(1) Al, Al alloy, Si, Ge, Ti, Zr, Hf, Nb, Ta, Cr, noble metals and inorganic compounds; or (2) any one of, or two or more of the components to be selected from among the group of components comprised of Si, Ge, Ti, Zr, Hf, Nb, Ta, Cr, noble metals and inorganic compounds and which are different from those as listed in (1above.

In the present invention, the unit deposits 3A, 3B constituting the unit periodic layer 3 are structured in a laminar fashion of the component from the group of components (1) and that from the group of components (2), in order to prevent the foregoing corrosion accelerating substances from penetrating through the deposit 2 into the surface of Al or Al alloy base 1 by laminating the component from the group of components (1) and that from the group of component (2) possessing more excellent corrosion resistance than the Al or Al alloy base 1.

If the deposit 2 is structured in a multilayers as indicated above, pin holes or other defects which might exist on each of the unit deposits 3A, 3B, constituting the unit periodic layer 3, are not continued to an adjacent unit deposit, making it impossible for corrosion accelerating substances penetrating the surface of the base 1.

Hence, the components of the unit deposits 3A, 3B constituting the unit periodic layer 3, should be selected from among the groups of components (1) and (2), so that any adjacent unit deposits are comprised of different components. In a lamination structure in which unit deposits made up of homogeneous components are placed adjacent to each other, the objects of the present invention cannot be effectively attained. This holds true when further layers of unit periodic layer 3 are laminated; it is to be ensured that unit deposits of identical components are not placed directly adjacent to each other.

As noted above, the present invention is characterized by forming, on the surface of Al or Al alloy base material, a deposit 2 of multilayer structure in which unit periodic layers 3 comprised of two ( or three or more ) layers of deposits are laminated periodically. To ensure that the corrosion resistance improvement effect due to a deposit 1 of such construction can be effectively displayed, it has become apparent that the thickness of the unit periodic layer 3 ($t_d$) and the repetition number of said unit periodic layers (D) [namely, which corresponds to the total thickness ($t_D$) of the deposit 1] should be adjusted properly.

On the following pages, descriptions will be given as to the effect upon corrosion resistance of the thickness ($t_d$) of the unit periodic layer 3 and the repetition number thereof (3), while referring to experimental results.

A pure Al plate that after being subjected to surface grinding with an emery paper up to #1500, degreased and washed with pure water and methyl alcohol, was used as substrate. On the surface thereof, Al and Si, and $SiO_2$ and Zr were synthesized alternately by a DC/RF magnetron sputter deposition, forming multilayer deposits varied in thickness of the unit periodic layer 3 ($t_d$) and different repetition numbers (D) thereof. The ratio (Ai:Si or $SiO_2$:Zr) of each of the unit deposits 3A, 3B constituting the unit periodic layer 3 was adjusted to be 1:1 in any of the variances as described above. The laminated structure of the unit periodic layer was confirmed by means of a small-angle X ray diffraction and observations with a transmission electron microscope. Corrosion resistance was evaluated on the basis of the pitting potential which was determined through dynamic potential polarization measurements at a sweep rate of 240 mV/min. in a 0.05 mol hydrochloric acid solution. The pitting potential was determined as a potential which attained 1A/m². The results are shown in FIGS. 2 through 4.

Figure 2:
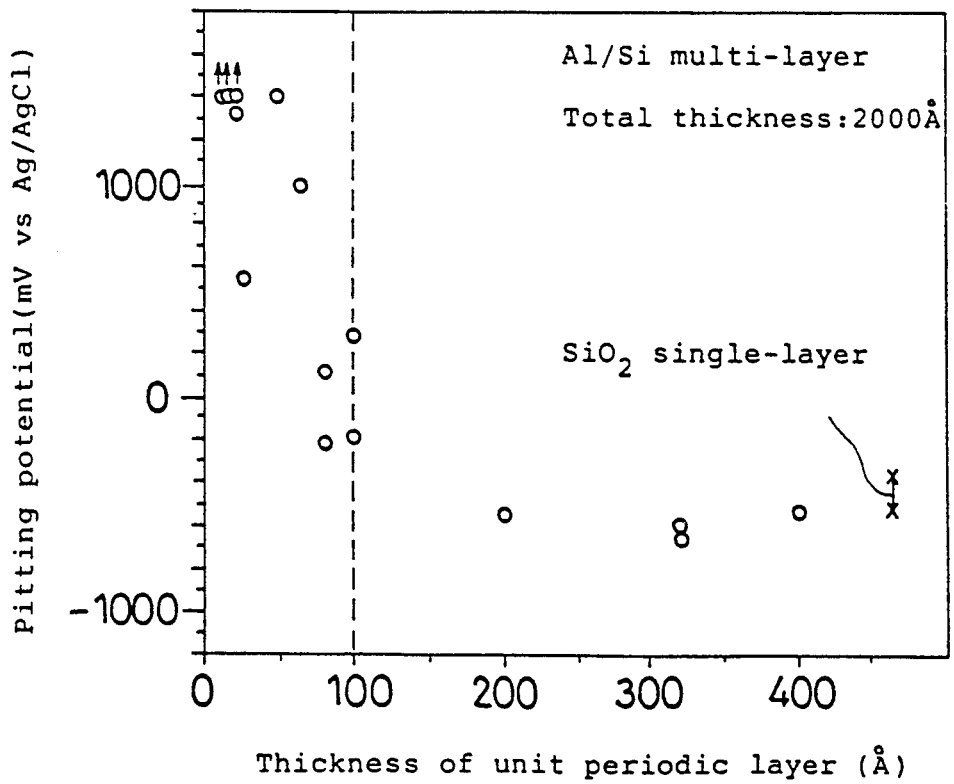

FIG. 2 is a graph depicting the result of the examinations of relationships between the thicknesss ($t_d$) of the unit periodic layer 3 and pitting potential, when Al and Si are used respectively as the component of the unit deposit 3A, 3B. The total thickness ($t_D$) of the deposit 1 was constant at 2000 521 .

For comparison, FIG. 2 also shows the test results with a pure Al plate on which a single-layer coating (a thickness of 1000 Å) comprised of $SiO_2$ which is used as corrosion resistant coating.

FIG. 3 is a graphical representation indicating the examination results of relationships between the thickness ($t_d$) of the unit periodic layer 3 and pitting potential, under the same conditions as in FIG. 2 above, except that $SiO_2$ and Zr are used respectively as the component of the unit deposit 3A, 3B, and the total thickness ($t_D$) of the deposit 2 was set at 1500 Å.

As is apparent from FIGS. 2 and 3, even though the total thickness ($t_D$) of the deposit 2 is identical, pitting potential varies conspicuously depending on the thickness ($t_d$) of the unit periodic layer 3, and it changes sharply at and beyond a thickness of around 100 Å. In the range of less than 100 Å, there are shown high pitting potentials, while beyond it they are decreased markedly, to the same level of potential as in the case of a coating formed of $SiO_2$ single layer.

It becomes known that to achieve corrosion resistance as high as the target value of the present invention, it is insufficient to provide a multilayer structure as described above, and that the thickness ($t_d$) of the unit periodic layer 3 must be 100 Å or less. In a preferred embodiment, the unit periodic layers are less than 50 Å thick and the total thickness of the deposit is more than five times the average thickness of the unit periodic layer and is less than 2,500 Å.

Corrosion resistance will be enhanced remarkably by rendering the thickness of the unit periodic layer less than 100 Å, presumably because: if the unit periodic layer 3 is as thick as or thicker than 100 Å, corrosive accelerating substances flow into cavities present inside the unit periodic layer on the lower layer side (the existing defects and those generated due to the subsequent exfoliation or corrosion dissolution when said corrosion accelerating substances penetrate through pin holes and other defects existing in the unit periodic layer on the upper layer side down to that on the lower side thereof, flow through said cavity in the direction vertical to the deposit to the existing defects of the unit periodic layer therebelow, further going successively deeper into the layer. At last, they reach the Al or ASl alloy base material 1, corroding said Al or Al alloy base material 1.

If the thickness of the unit periodic layer is less than 100 Å cavities present in said unit periodic layer is naturally less than 100 Å. Accordingly, even when water containing corrosion accelerating substances penetrates through the defect in the unit periodic layer on the upper layer side, the water is hard to penetrate said cavity due to the surface tension, or if it enters, it stops at the entrance of said cavity, and hence is difficult to penetrate the inside thereof. Accordingly, the corrosion accelerating substance is blocked at said unit periodic layer, and cannot reach the Al or Al alloy base material 1, ensuring that the corrosion prevention effect can be achieved.

FIG. 4 indicates the results of examining the relationships between the repetition number (D) of the unit periodic layer 3 at the deposit 2 and pitting potential, where Al and Si are used respectively as the components of the unit deposits 3A, 3B. A pure Al was employed as base material, the average thickness of the unit periodic layer 3 was set at 50 Å, and plating and measurement methods of pitting potential were the same as in FIG. 2 above.

As is apparent from FIG. 3, even if the thickness of the unit periodic layer 3 is less than 100 Å, pitting potentials vary markedly with the repetition number (D) thereof, and they change drastically at and beyond a repetition number of around 5. When the repetition number (D) is less than 5, the pitting potentials are too low to give satisfactory corrosion resistance, while when it is 5 or greater, high levels of pitting potentials are generated, thus giving superb corrosion resistance. In other words, in order to ensure that the effect of penetration prevention of said corrosion accelerating substances achieved by making the thickness of the unit periodic layer 3 ($t_d$) less than 100 Å can be effectively obtained, it is necessary to structure said unit periodic layer 3 of at least more than 5 layers and make the total thickness ($t_D$) of the deposit 2 more than five times as thick as the mean thickness of the unit periodic layer 3.

As has been discussed above, the present invention ensures that corrosion accelerating substances are prevented from passing through deposits and penetrating deeper into the surface of Al or Al alloy base material and hence that Al or Al alloy base materials are prevented from corrosion by specifying the components of a unit deposit and also making the unit periodic layers, comprised of laminating said unit deposits in two or three more layers, 100 Å or less thick, and further by setting the repetition number of said unit periodic layer at 5 or more. In a deposit formed of multilayer structure according to the present invention, it is of course permissible that the various components interdiffuse at lamination interfaces of the various unit deposits. Such interdiffusion improves the layer-to-layer adhesiveness among the unit deposits, giving better corrosion resistance.

The deposition procedures employed in providing corrosion-resistant Al or Al alloy materials of the present invention include sputtering, vapor deposition, electroplating, chemical plating, and other methods heretofore known. The most common methods in this invention wherein deposits of multiple layer structure are formed, are spattering and vapor deposition plating. The Al or Al alloy materials to which the present invention is applicable cover pure Al, and various Al alloys containing any one of or two or more of Mg, Si, Mn, Cu, Zn, Cr, Ni, Fe and the like as alloy element. The present invention can be applied to line- or rod- shaped objects, together with the most common plate shaped ones, depending on applications.

What I claim is:

1. A conductor material for a semiconductor device, a corrosion-resistant Al or Al alloy material of Al alloyed with a metal selected from the group consisting of Mg, Si, Mn, Cu, Zn, Cr, Ni, Fe and mixtures thereof on the surface of which deposits are formed, said deposits comprising unit periodic layers formed such that unit deposits of a plurality of layers consisting of components selected from groups (1) or (2), the layers being adjacent to each other, with each of said layer being formed of said components different from one another, and characterized by the fact that said unit periodic layers are less than 50 Å thick, and that the total thickness of the deposit is more than five times the average thickness of said unit periodic layer and is less than 2,500 Å, said groups (1) and (2) being selected from the group consisting of:

(1) Al, Si, Ti, Zr, Hf, Nb, Ta, Cr, noble metals, their oxides, carbides, nitrides, borides, silicides and mixtures thereof, and
(2) Si, Ti, Zr, Hf, Nb, Ta, Cr, noble metals, their oxides, carbides, nitrides, borides, silicides and mixtures thereof.

2. A corrosion-resistant Al or Al alloy material as specified in claim 1 wherein one of the components as described in claim 1 is Al.

3. A corrosion-resistant Al or Al alloy material of claim 1, wherein each components (1) and (2) is present in an amount effective to impart corrosion-resistance to the Al or Al alloy material.

* * * * *

UNITED STATES PATENT AND TRADEMARK OFFICE
CERTIFICATE OF CORRECTION

PATENT NO. : 5,330,851
DATED : JULY 19, 1994
INVENTOR(S) : TAKENORI NAKAYAMA ET AL

It is certified that error appears in the above-indentified patent and that said Letters Patent is hereby corrected as shown below:

Column 1, line 43, "approx" should read --approx.--.

Column 5, line 14, "2000 521" should read --2000 Å--.

Column 5, line 58, "AS1" should read --A1--.

Column 6, line 14, "FIG.3" should read --FIG. 4--.

Column 6, line 54, "spattering" should read --sputtering--.

Signed and Sealed this

Sixth Day of December, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,330,851
DATED : JULY 19, 1994
INVENTOR(S) : Takenori NAKAYAMA et al It is certified that error appears in the above-identified patent and that said Letters Patent is hereby corrected as shown below:

Column 1, before line 1, insert the following:

--This invention was made with Government support under Contract DMR8902232, awarded by the National Science Foundation. The Government has certain rights in this invention.--.

Signed and Sealed this

Sixth Day of June, 1995

*Attest:*

BRUCE LEHMAN

*Attesting Officer*   *Commissioner of Patents and Trademarks*